United States Patent [19]
Fazis

[11] Patent Number: 4,729,273
[45] Date of Patent: Mar. 8, 1988

[54] NOTCHING MACHINE

[75] Inventor: Harald Fazis, Weil, Fed. Rep. of Germany

[73] Assignee: Ludwig Boschert GmbH & Co. KG, Fed. Rep. of Germany

[21] Appl. No.: 10,226

[22] Filed: Feb. 3, 1987

[30] Foreign Application Priority Data

Feb. 13, 1986 [DE] Fed. Rep. of Germany ....... 3604516

[51] Int. Cl.⁴ .................. B21D 28/02; B23D 15/08
[52] U.S. Cl. .................................. 83/559; 83/620; 83/693; 83/917; 144/217
[58] Field of Search ............... 83/620, 917, 692, 559, 83/693, 696, 641, 581; 144/217

[56] References Cited

U.S. PATENT DOCUMENTS

| | | | |
|---|---|---|---|
| 3,570,356 | 3/1971 | Williams et al. | 83/917 X |
| 3,958,482 | 5/1976 | Claesson | 83/559 |
| 3,996,829 | 12/1976 | Tromponi | 83/917 X |
| 4,483,227 | 11/1984 | Camisa | 83/559 |
| 4,535,665 | 8/1985 | Fazis | 83/559 X |
| 4,611,519 | 9/1986 | Hagerty | 83/917 X |

Primary Examiner—Donald R. Schran
Attorney, Agent, or Firm—Ratner & Prestia

[57] ABSTRACT

In a notching machine using a blade assembly of upper and lower knives mounted respectively on a vertically moving ram and a machine table and each comprising two individual blades forming with their cutting edges a coinciding vertex angle which may be changed by turning the blades relative to each other around a vertical axis of rotation that extends in parallel with the ram near the noses of the knives, a third blade component is provided at least for the upper knife for forming its nose portion with a unitary cutting edge that complements the cutting edges of the two other blades of the upper knife for confining its vertex angle.

12 Claims, 8 Drawing Figures

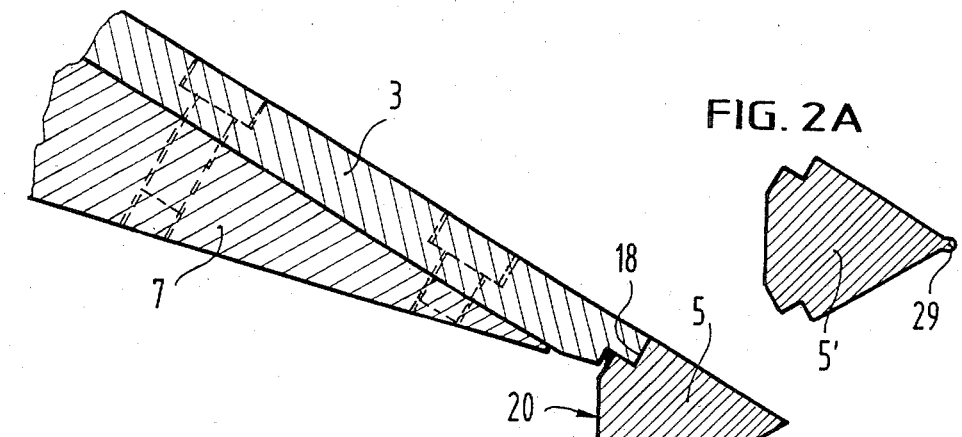
FIG. 2A
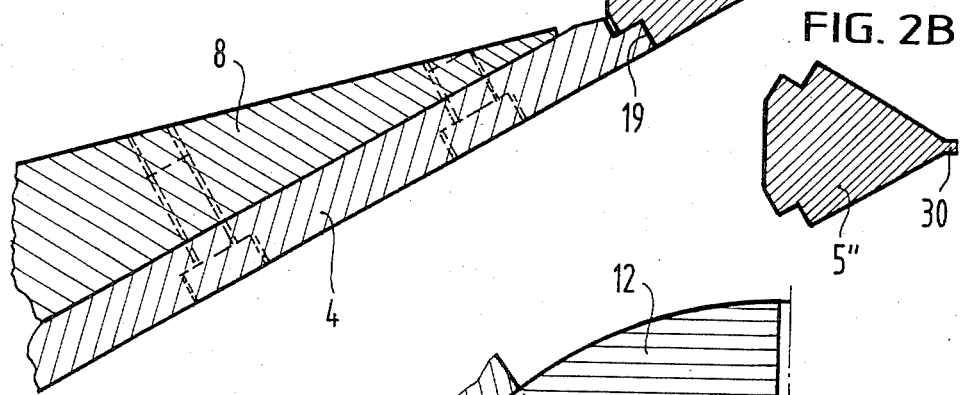
FIG. 2B
FIG. 2
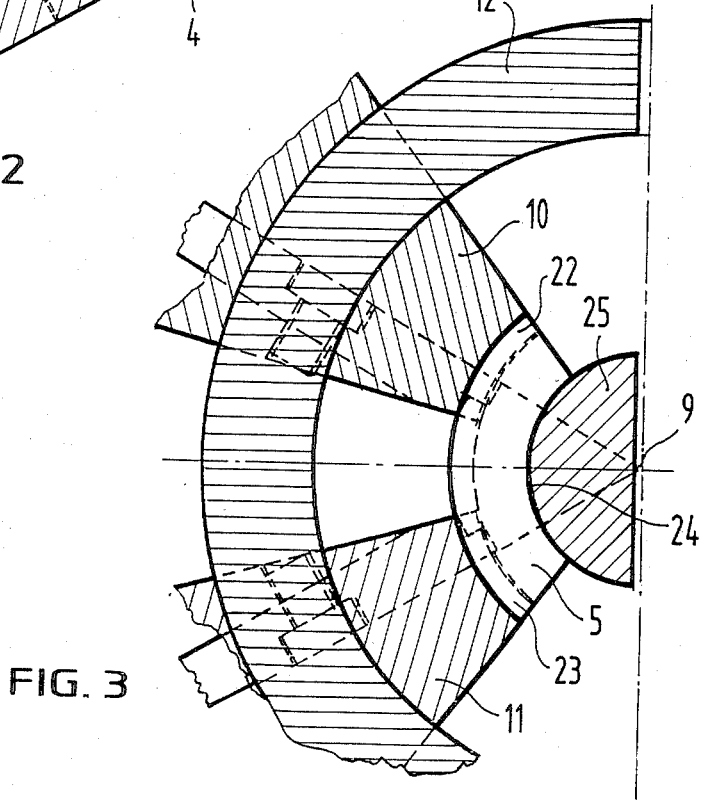
FIG. 3

NOTCHING MACHINE

FIELD OF THE INVENTION

This invention relates to a notching machine in which workpieces may be notched with any desired notching angle.

BACKGROUND ART

A prior art notching machine of the kind as herein referred is described in U.S. Pat. No. 4,483,227. In this known notching machine a blade assembly is being used that comprises an upper knife and a lower knife that are respectively mounted on a projecting head serving as a tool holder of a vertically moving ram and on the machine table. The upper and the lower knives are each composed of two individual blades which with their cutting edges confine a vertex angle on a nose portion of each knife to thusly allow a notching of workpieces with a notching angle that corresponds to this vertex angle. For now providing notchings in workpieces of any desired size of angle this known notching machine is further provided with means that allow to change the vertex angle by turning the two blades of each knife relative to each other around a vertical axis of rotation that extends in parallel with the ram near the noses of the upper and lower knives. With this possibility a notching machine is being presented which allows a variable notching of workpieces over a consumer-oriented working range between for example an angle of 30° and an angle up to 120° or more whereby each notching with any desired angle within this particular range of adjustment for the two blades of each upper and lower knife is being effected by a single working stroke of the ram. Under consideration thereof that the cutting capacity of such notching machines is usually rated by a reference to the blade life and in particular to that of a upper knife at its most critical nose portion this prior notching machine, however, presents the disadvantage that each of the two blades of the upper knife as well as of those of the lower knife of the blade assembly must be provided with a vertex angle of 15° for allowing a notching of workpieces with a minimum notching angle of 30°. Since such a corresponding minimum vertex angle of 15° provides a much shorter blade life than for example a vertex angle of 30° these known notching machines are usually equipped with at least two sets of blades for the upper knife of the blade assembly whereby the two blades of the one set are each provided with a vertex angle of 15° whereas the two blades of the second set are each provided with a vertex angle of 30°. The blades with the smaller vertex angle are then usable for notching angles from 30° to 60° whereas the blades with the larger vertex angle cover the remaining range of variable notching angles from 60° to 120° or 135° so that with the use of such a second set of blades at least for the upper knife of the blade assembly an overall cutting capacity will be obtained that can be considered as superior in comparison with a notching machine which is only equipped with the one set of blades for covering the entire range of notching angles.

This invention deals with the object of providing a notching machine allowing the notching of workpieces with any desired notching angle by using a blade assembly of which the nose portion at least of the upper knife underlies a less critical load condition to thereby obtain an overall blade life which when high-lighted on certain preferred notching angles of the variably adjustable range will more or less correspond with the blade life of a corresponding number of upper knives each having a fixed vertex angle of the corresponding different sizes. According to a further object of the invention there shall also be provided a notching machine having a blade assembly of which at least the upper knife when set up at its nose portion to any particular consumer-oriented vertex angle then of course along a correspondingly adjusted vertex angle of the lower knife provides a cutting capacity or blade life which for such a particular vertex angle corresponds to the one of an upper knife having the corresponding fixed vertex angle as confined by two cutting edges.

According to the present invention there is provided a notching machine having a blade assembly of which at least the upper knife comprises a third blade component for forming its nose portion and having a unitary cutting edge that complements the cutting edges of the two other blades of the upper knife for confining its vertex angle whereby this third blade component is being mounted interchangeably on the tool holder at the projecting head of the machine's vertically moving ram and is being made available with differently sized vertex angles and/or with different contours of the cutting edge.

The notching machine of the present invention accordingly allows the notching of workpieces with any desired notching angle each with a single working stroke of the machine's vertically moving ram and each with the use of an upper knife of the blade assembly the two primary blades of which then have before been adjusted along a corresponding adjustment of the two blades of the lower knife to the corresponding vertex angle which at least for this upper knife then also has been before provided by mounting the particular third blade component on the tool holder of the ram's projecting head. Under consideration thereof that for a variable range of notching angles between 30° and 135° the common consumer-oriented use mostly calls for the availability of eight differently sized vertex angles differing from each other in an ascending sequence by an angle of 15° it then should be realized that the notching machine of this invention must only be equipped with eight of such third blade components having the differently sized vertex angles each at a unitary cutting edge that complements the cutting edges of the two other blades of the upper knife. When using such third components as the nose portion at least of the upper knife this of course substantially reduces the overall costs of the blade assembly besides of guaranteeing an encouraging overall blade life.

BRIEF DESCRIPTION OF THE DRAWINGS

FIG. 2 is a section through the upper knife along the line II—II in FIG. 1;

FIG. 2A is a top view of the third knife component of the upper knife according to a second embodiment;

FIG. 2B is a tip view of the third knife component of the upper knife according to a third embodiment;

FIG. 3 is a section through the gripping device for the third knife component of the upper knife along the line III—III in FIG. 1;

DESCRIPTION OF THE PREFERRED EMBODIMENT

Figure 1:
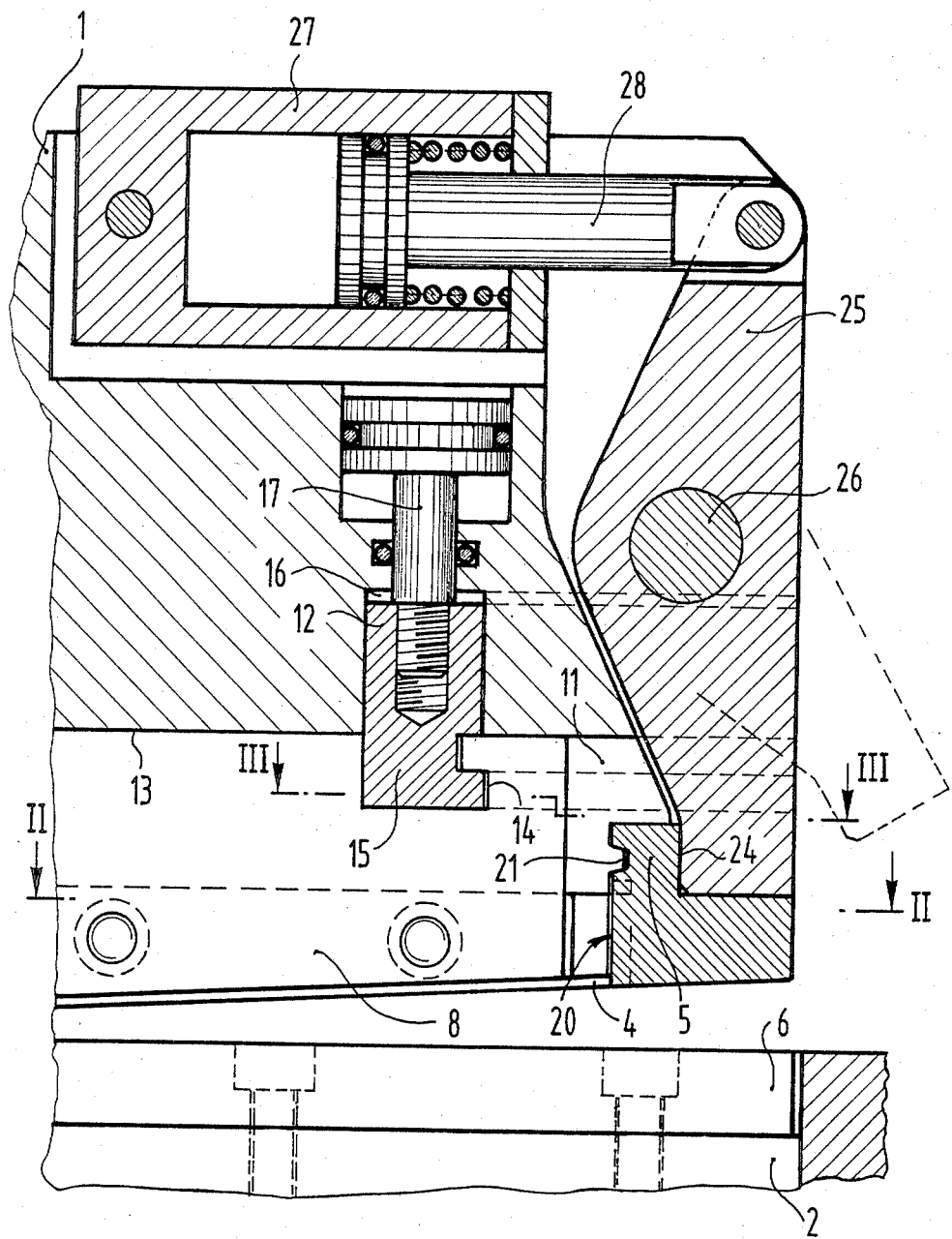
FIG. 1 is cross-sectional view of the notching machine according to the present invention.

Referring to FIGS. 1-3, the notching machine of this invention may for example be realised with a notching machine as described in U.S. Pat. No. 4,129,054 and also incorporating constructional details of a notching machine as described in U.S. Pat. No. 4,535,665, both issued in the name of the assignee of this invention. A notching machine of this kind is provided with a vertically moving ram having a projecting head 1 above a machine table 2 serving as a support for workpieces to be notched with any desired notching angle. The projecting head 1 serves as a tool holder for an upper knife which is composed of two individual blades 3 and 4 and a third blade component 5 which forms a nose portion of the upper knife and which is provided with a unitary cutting edge that complements the cutting edges of the two other blades of the upper knife for confining its vertex angle. For providing notchings in workpieces with a notching angle corresponding to the vertex angle of this third blade component 5 of the upper knife by a single working stroke of the vertically moving ram, the notching machine further comprises a lower knife 6 that is attached to the machine table 2 and composed of two blades which without the use of an additional component confine a vertex angle at a corresponding nose portion of the lower knife 6 having the same size as the vertex angle of the third blade component 5 of the upper knife.

The two individual blades 3,4 of the upper knife are each screwed to a knife carrier 7,8 for being replaceable in a simple manner. The two knife carriers 7,8 may be turned around a vertical axis of rotation 9 that extends in parallel with the ram near the nose of the upper knife so that when such a turning of the knife carriers 7,8 is being effected the cutting edges of the blades 3,4 may be adjusted to any desired notching angle at the nose of the upper knife which then will correspond to the vertex angle provided by the unitary cutting edge of the third blade component 5 complementing the cutting edges of these blades when the particular third blade component has been mounted on the projecting head 1 of the ram. For allowing this turning each knife carrier 7,8 is rigidly attached to a set collar 10,11 or is integrally formed on such set collars which as particularly shown in FIG. 3 are guided by a guide collar 12 providing a circular guide that is concentric to the vertical axis of rotation 9. The set collars 10,11 also contact a lower guide surface 13 of the head 1 and are retained on the guide collar 12 by the cooperation of an undercut retaining groove 14 formed on each set collar 10,11 and a retaining web 15 of the guide collar which as clearly shown in FIG. 1 projects into the retaining grooves of the two set collars. The guide collar 12 is movably inserted in a retaining groove 16 of the head 1 whereby the vertical moving of the guide collar may be effected by means of a double acting piston and cylinder arrangement the piston of which is either pneumatically or hydraulically moved by any suitable pressure control. There are preferably provided three commonly controlled piston and cylinder arrangements as equally spaced along the length of the guide collar 12 with a connection of a piston rod 17 of each piston to the guide collar 12 in the manner shown in FIG. 1 so that in the raised position of the guide collar 12 the two set collars 10,11 will be tightened against the lower guide surface 13 in respect to which the set collars will be losened whenever the guide collar 12 is being moved by its interconnected pistons to a lowered position. In this lowered position of the guide collar 12 the two set collars 10, 11 may be moved along the guide collar to thereby turn the two blades 3,4 of the upper knife around the vertical axis of rotation 9 into a position then corresponding to any desired notching angle which position of the two blades when adjusted along any conveniently provided angle scale will subsequently be fixed by then again tightening the guide collar 12 into its raised position. It should be understood that the vertical moving of the guide collar could also be effected by other means.

The third blade component 5 is formed with a substantial triangular shape as shown in FIG. 2. The one corner portion of the triangle confines the particular vertex angle of the upper knife so that the vertical axis of rotation 9 extends through the tip of this one corner portion as clearly shown in FIG. 3. The other two corner portions of the triangle are each formed with a stepped fitting surface 18 and 19 matching with complementary shaped abutment surfaces on the blades 3 and 4. When these blades are adjusted with the relative angular position of their cutting edges to an angle which is the same as the vertex angle of the then used third blade component 5, a cutting edge will be obtained for the upper knife that is composed of the cutting edges of the two blades 3 and 4 and of the unitary cutting edge of the third knife component 5 presenting a slant that is slightly directed upwardly towards the nose of the upper knife as also shown in FIG. 1. The two fitting surfaces 18,19 of the third blade component 5 are otherwise bridged by a back 20 which is formed with a retaining groove 21 that extends along a curve which is concentric to the vertical axis of rotation 9. Two projecting ribs 22,23 provided on the two set collars 10 and 11 are fitted into this retaining groove 21 for serving as abutments in respect to a gripping surface 24 which as shown in FIG. 1 is formed on the third blade component 5 opposite to its retaining groove 21 and therefore at a forward position. The gripping surface 24 is provided on the third blade component 5 for being gripped by a gripping device that is arranged on the projecting head 1. This gripping device comprises a quick-catch gripping lever 25 which is rotatably supported by a transversely extending pivot 26 so as to be operated by a piston and cylinder arrangement 27. The piston of this piston and cylinder arrangement 27 is driveably connected to the lever 25 through its piston rod 28 in such a manner that whenever a pneumatic or hydraulic pressure is admitted to a relevant pressure chamber of the cylinder the piston will thereby be moved into a position against the biasing force of a resetting spring in which the lever 25 as actuated by the piston rod 28 will be forced against the gripping surface 24 of the third blade component 5 which then will be forced with its retaining groove 21 against the projecting abutment ribs 22,23 of the two set collars 10,11 so that with this interaction the third blade component 5 will as rigidly be held on the projecting head 1 of the vertically moving ram as are the two individual blades 3,4 of the upper knife which are screwed to the knife carriers 7 and 8. On the other side, when the either pneumatic or hydraulic pressure is released from the piston and cylinder arrangement 27, the piston of the same will then be moved by the resetting spring to a starting position in which the lever 25 will have been rotated counterclockwise into a position as shown with dotted lines in FIG. 1 in which the third blade component 5 may then be easily removed for its replacement by a new component with either the same or a different vertex angle. The quick-catch gripping lever 25 as operated by the piston and cylinder arrangement 27 accordingly secures a very simple and quick replacement of the third blade component 5 which also would be possible with the realisation of a gripping device for example in the form of a toggle-type fastener.

In FIGS. 2A and 2B two alternative embodiments of the third blade component are shown which, however, are also basically formed with the same triangular shape. The third blade component 5' of FIG. 2A has at its corner portion confining the vertex angle of the upper knife a roundness 29 through the centre of which the vertical axis of rotation 9 would extend. The third blade component 5" of FIG. 2B is at the same corner portion provided with an rectangular enlargement 30 through the centre of which the vertical axis of rotation 9 again would extend. It of course has to be understood that when these third blade components 5' or 5" are being used instead of the third blade component 5 for complementing with their accordingly different unitary cutting edge the cutting edges of the two other blades 3,4 of the upper knife in an identical manner, the lower knife 6 then must also be provided with a nose portion of the corresponding shape.

Figure 4:
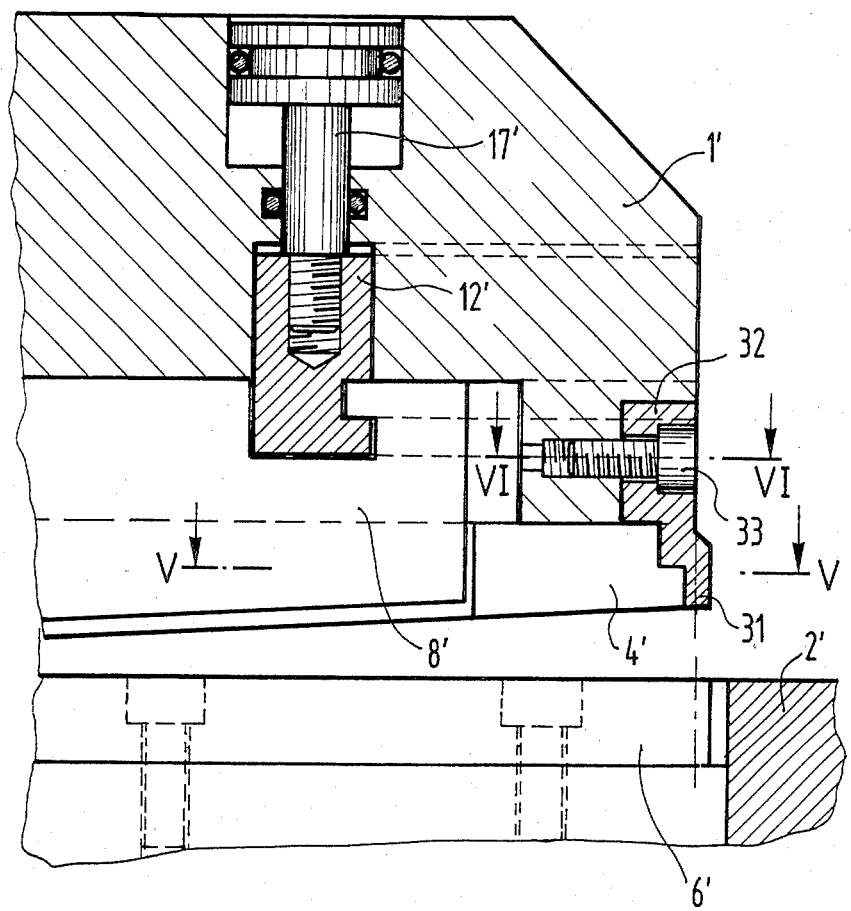
FIG. 4 is a cross-sectional view of the notching machine according to a second embodiment of the present invention.
Figure 5:
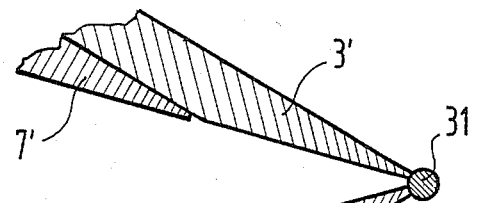
FIG. 5 is a section through the upper knife along the line V—V in FIG. 4.
Figure 6:
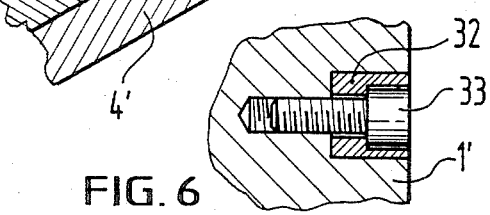
FIG. 6 is a section along the line VI—VI in FIG. 4.

In FIGS. 4–6 a second embodiment of the notching machine is shown which principally corresponds in its main structural features to the before described notching machine. All corresponding parts are therefore referred with the same numerals and supplemented with a prime notation. For this second embodiment of the inventive notching machine the third blade component 31 is being used for the upper knife of the blade assembly which instead of the triangular shape as shown in FIG. 2 for the third blade component 5 is formed with a circular cutting edge which complements the cutting edges of the two other blades 3',4' of the upper knife and which per se is acting during a working stroke of the machine's vertically moving ram in the manner of a press plunger. This circular third blade component 31 has an enlarged head portion 32 at which it is screwed to the projecting head 1' of the machine's vertically moving ram by means of at least one bolt 33. When looking at FIG. 5 it will become obvious that the circular cutting edge of this third blade component 31 functions more or less in the same manner as the roundness 29 of the triangular blade component 5' of FIG. 2A in comparison with which, however, the advantage will be obtained that without replacement of this third blade component 31 the same could be used for the notching of workpieces with any desired notching angle for example between 30° and 60° whereby any change to a new notching angle would only necessitate a corresponding adjustment of the two blades 3' and 4' along the guide collar 12' in the same manner as before described for the notching machine of FIGS. 1–3. On the other hand it may be understood that the mounting principle which is realised for the third blade component 31 could also be realised in the notching machine using the triangular shaped blade components for example only for a small number of different vertex angles so that any change-over time in question will not be critically considered. Finally it may also be understood that the circular cutting edge as realised for the third blade component 31 could instead be replaced by any arbitrary contour as it of course could also be realised for the contour of the unitary cutting edge of the third blade component 5 without departing from the scope of the present invention. Whereas a third blade component has herein been described for being used only for the upper knife, it should be understood that the lower knife of the blade assembly could as well comprise such a third component then forming its nose portion.

What is claimed is:

1. A notching machine having a vertically moving ram which is provided with a projecting head serving as a tool holder for an upper knife of a blade assembly which further comprises a lower knife that is attached to a machine table, the upper and the lower knives being each composed of two individual blades forming with their cutting edges a coinciding vertex angle which may be changed by turning the two blades of each knife relatively to each other around a vertical axis of rotation that extends in parallel with said ram near the noses of said upper and lower knives, comprising:
    a third blade component which at least is provided for said upper knife for forming its nose portion and having a unitary cutting edge that complements the cutting edges of the two other blades of the upper knife for confining its vertex angle;
    said third blade component being mounted interchangeably on said tool holder and being made available with differently sized vertex angles and-/or with different contours of said unitary cutting edge.

2. A notching machine according to claim 1 in which said third blade component is formed with a substantial triangular shape one corner portion of which confines the vertex angle of the upper knife.

3. A notching machine according to claim 2 in which said one corner portion is provided at its tip with a rounded polygonal enlargement that complements the contour of the unitary cutting edge of the third blade component.

4. A notching machine according to claim 1 in which two fitting surfaces are formed on said third blade component matching each with a complementary shaped abutment surface on the two other blades of the upper knife.

5. A notching machine according to claim 1 in which a gripping surface is formed on said third blade component for being gripped by a gripping device that is arranged on the projecting head of the vertically moving ram and provided for interchangeably holding said third blade component on said tool holder.

6. A notching machine according to claim 5 in which said gripping device comprises a quick-catch gripping lever being operated by a piston and cylinder arrangement.

7. A notching machine according to claim 1 in which said third blade component is supported on abutments of the two other blades of the upper knife.

8. A notching machine according to claim 7 in which a back of said third blade component is provided with a retaining groove extending along a curve concentric to the vertical axis of rotation and cooperating with two forwardly projecting abutment ribs provided on two set collars carrying the two other blades of the upper knife and being movable along a guide collar that is also concentric to said vertical axis of rotation.

9. A notching machine according to claim 1 in which said third blade component is provided with a circular cutting edge acting in the kind of a pressplunger.

10. A notching machine according to claim 9 in which said third blade component is provided with an enlarged head portion at which it is directly screwed to the projecting head of the vertically moving ram.

11. A blade assembly for use in a notching machine, comprising:
an upper knife and a lower knife that are respectively intended for being mounted on the vertically moving ram and on the machine table of the notching machine;
said upper and lower knives each comprising two individual blades which when mounted on the vertically moving ram and on the machine table confine a coinciding vertex angle on a nose portion of each knife; and
a third blade component provided at least for said upper knife for forming its nose portion and having a unitary cutting edge that complements the cutting edges of the two other blades of the upper knife for confining its vertex angle.

12. A blade assembly according to claim 11 in which a plurality of third blade components is provided having each a unitary cutting edge with differently sized vertex angles and/or of a different contour for complementing the cutting edges of the two other blades of the upper knife.

* * * * *